(12) United States Patent
Sawada

(10) Patent No.: US 10,958,078 B2
(45) Date of Patent: Mar. 23, 2021

(54) POWER GENERATION SYSTEM AND POWER GENERATION SYSTEM CONTROL METHOD

(71) Applicant: KANEKA CORPORATION, Osaka (JP)

(72) Inventor: Toru Sawada, Osaka (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 16/638,001

(22) PCT Filed: Jul. 27, 2018

(86) PCT No.: PCT/JP2018/028286
§ 371 (c)(1),
(2) Date: Feb. 10, 2020

(87) PCT Pub. No.: WO2019/031276
PCT Pub. Date: Feb. 14, 2019

(65) Prior Publication Data
US 2020/0220356 A1    Jul. 9, 2020

(30) Foreign Application Priority Data

Aug. 10, 2017 (JP) .............................. JP2017-155958

(51) Int. Cl.
*H02J 3/38* (2006.01)
*H02S 40/32* (2014.01)
(Continued)

(52) U.S. Cl.
CPC .............. *H02J 3/381* (2013.01); *H02J 50/12* (2016.02); *H02J 50/40* (2016.02); *H02S 40/32* (2014.12); *H02J 2300/24* (2020.01)

(58) Field of Classification Search
CPC .... H02J 3/381; H02J 3/38; H02J 50/12; H02J 50/40; H02J 2300/24; H02S 40/32
See application file for complete search history.

(56) References Cited

U.S. PATENT DOCUMENTS

| | | | |
|---|---|---|---|
| 2012/0019074 | A1 | 1/2012 | Frolov et al. |
| 2012/0086283 | A1 | 4/2012 | Yamamoto et al. |

(Continued)

FOREIGN PATENT DOCUMENTS

| | | | |
|---|---|---|---|
| JP | 2004-203178 A | 7/2004 | |
| JP | 2010-220301 A | 9/2010 | |

(Continued)

OTHER PUBLICATIONS

International Search Report issued in International Application No. PCT/JP2018/028286, dated Sep. 4, 2018 (2 pages).

(Continued)

*Primary Examiner* — Robert L Deberadinis
(74) *Attorney, Agent, or Firm* — Osha Bergman Watanabe & Burton LLP

(57) ABSTRACT

A power generation module including: a power generation element; an AC generation circuit configured to convert DC current output from the power generation element into AC current; a module-side inductance element configured to generate a magnetic field from the AC current; a phase information acquiring circuit; and a control circuit; and a power-collector closed circuit including a power collector-side inductance element configured to electromagnetically couple to the module-side inductance element to generate an induced electromotive force, wherein, when reference AC current flowing in the power-collector closed circuit flows through the power collector-side inductance element, the module-side inductance element electromagnetically coupled to the power collector-side inductance element generates AC current corresponding to the reference AC (Continued)

current, and the control circuit acquires phase information related to the reference AC current via the phase information acquiring circuit so that the control circuit controls the AC generation circuit in accordance with the phase information.

20 Claims, 3 Drawing Sheets

(51) Int. Cl.
*H02J 50/12* (2016.01)
*H02J 50/40* (2016.01)

(56) References Cited

U.S. PATENT DOCUMENTS

2014/0169053 A1* 6/2014 Ilic .......................... H02J 3/387
363/132
2014/0232197 A1 8/2014 Keeling et al.

FOREIGN PATENT DOCUMENTS

JP 2012196117 A 10/2012
WO 2012/046452 A1 4/2012

OTHER PUBLICATIONS

Written Opinion issued in International Application No. PCT/JP2018/028286, dated Sep. 4, 2018 (8 pages).
Extended European Search Report issued in corresponding European Patent Application No. 18844271.9, dated Dec. 11, 2020 (101 pages).

* cited by examiner

POWER GENERATION SYSTEM AND POWER GENERATION SYSTEM CONTROL METHOD

TECHNICAL FIELD

The present invention relates to a power generation system, and more particularly, to a photovoltaic power generation system, and to a control method therefor.

BACKGROUND ART

A photovoltaic power generation system generally includes a plurality of solar cell modules, a wiring cable configured to connect those solar cell modules in a series-parallel configuration, a power conditioner configured to convert DC power generated by the solar cell modules into AC power, and the like. In recent years, power generation cost of solar cells has become close to cost of power generation by fossil energy, and accordingly, it has become more general to install the photovoltaic power generation system to general residences, large-scale buildings, and other constructions. At the same time, the solar cell modules have been required to satisfy strict specifications, and a design life of more than 30 years is required.

In view of this point, the power generation system described in Patent Literature 1 includes a first power generation unit, a second power generation unit, and a combining section. Each of the first power generation unit and the second power generation unit includes an oscillator configured to convert DC energy output from a power generation device into high-frequency energy, a power transmission antenna configured to transmit the high-frequency energy output from the oscillator by a magnetic resonance method, and a power receiving antenna. The power receiving antenna is configured to send the high-frequency energy transmitted from the power transmission antenna to the combining section. The power generation system described in Patent Literature 1 further includes an oscillation phase controller configured to perform phase control on the first power generation unit and the second power generation unit so that a phase difference between the first power generation unit and the second power generation unit becomes substantially equal to zero when high-frequency output of the first power generation unit and high-frequency output of the second power generation unit are combined with each other.

CITATION LIST

Patent Literature

[PTL 1] WO 2012/046452 A1

SUMMARY OF INVENTION

Technical Problem

However, in the related-art power generation system, the phase control has been complicated. That is, in the above-mentioned configuration of the related art, a transmission line from each power generation unit to the combining section varies in length, and hence it is necessary to individually set the control contents of the oscillation phase control unit according to the length of each transmission line. Therefore, oscillation phase controllers different in control contents are required to be prepared in accordance with the number of power generation units. As a result, the phase control has been complicated.

The present disclosure has been made in view of the above-mentioned problem, and has an object to achieve a configuration capable of performing phase control more simply.

Solution to Problem (1) A power generation system according to one embodiment of the present disclosure includes: a first power generation module including: a first power generation element; a first AC generation circuit configured to convert first DC current output from the first power generation element into first AC current; a first module-side inductance element configured to generate a magnetic field from the first AC current; a first phase information acquiring circuit; and a first control circuit; and a power-collector closed circuit including a first power collector-side inductance element configured to electromagnetically couple to the first module-side inductance element to generate an induced electromotive force, wherein, when reference AC current flowing in the power-collector closed circuit flows through the first power collector-side inductance element, the first module-side inductance element electromagnetically coupled to the first power collector-side inductance element generates AC current corresponding to the reference AC current in the first power generation module, and the first control circuit acquires phase information related to the reference AC current via the first phase information acquiring circuit so that the first control circuit controls the first AC generation circuit in accordance with the phase information.

(2) In the power generation system according to the above-mentioned item (1), the power generation system may further include a reference power generation module including: a reference power generation element; a reference AC generation circuit configured to convert reference DC current output from the reference power generation element into AC current; and a module-side reference inductance element configured to generate a magnetic field from the AC current, and the power-collector closed circuit may further include a power collector-side reference inductance element configured to electromagnetically couple to the module-side reference inductance element to generate an induced electromotive force and the reference AC current in the power-collector closed circuit.

(3) In the power generation system according to the above-mentioned item (1), the power generation system may further include a second power generation module including: a second power generation element; a second AC generation circuit configured to convert second DC current output from the second power generation element into second AC current; a second module-side inductance element configured to generate a magnetic field from the second AC current; a second phase information acquiring circuit; and a second control circuit, the power-collector closed circuit may further include: a second power collector-side inductance element configured to electromagnetically couple to the second module-side inductance element to generate an induced electromotive force; and a reference AC wave generation source configured to generate the reference AC current, and, when the reference AC current flowing in the power-collector closed circuit flows through the second power collector-side inductance element, the second module-side inductance element electromagnetically coupled to the second power collector-side inductance element may generate AC current corresponding to the reference AC current in the second power generation module, and the second control circuit may acquire phase information related to the reference AC current via the second phase information acquiring circuit so that the second control circuit controls the second AC generation circuit in accordance with the phase information.

(4) In the power generation system according to the above-mentioned item (2), the reference power generation module may further include a reference capacitance element configured to cause resonance together with the module-side reference inductance element.

(5) In the power generation system according to the above-mentioned item (3), the second power generation module may further include a second capacitance element configured to cause resonance together with the second module-side inductance element.

(6) In the power generation system according to any one of the above-mentioned items (1) to (5), the first power generation module may further include a first capacitance element configured to cause resonance together with the first module-side inductance element.

(7) In the power generation system according to the above-mentioned item (6), the first control circuit may be configured to acquire frequency information related to the reference AC current via the first phase information acquiring circuit, and the first control circuit may be configured to control a capacitance value of the first capacitance element in accordance with the frequency information.

(8) In the power generation system according to the above-mentioned item (5), the second control circuit may be configured to acquire frequency information related to the reference AC current via the second phase information acquiring circuit, and the second control circuit may be configured to control a capacitance value of the second capacitance element in accordance with the frequency information.

(9) In the power generation system according to any one of the above-mentioned items (1) to (8), the first power generation module may further include a first switching element configured to switch a target to be connected in parallel to the first power generation element between the first AC generation circuit and the first phase information acquiring circuit, when the first control circuit acquires the phase information, the first control circuit may switch a connection destination of the first switching element to the first phase information acquiring circuit, and when the first control circuit controls the first AC generation circuit in accordance with the phase information, the first control circuit may switch the connection destination of the first switching element to the first AC generation circuit.

(10) In the power generation system according to the above-mentioned item (3), the second power generation module may further include a second switching element configured to switch a target to be connected in parallel to the second power generation element between the second AC generation circuit and the second phase information acquiring circuit, when the second control circuit acquires the phase information, the second control circuit may switch a connection destination of the second switching element to the second phase information acquiring circuit, and when the second control circuit controls the second AC generation circuit in accordance with the phase information, the second control circuit may switch the connection destination of the second switching element to the second AC generation circuit.

(11) In the power generation system according to the above-mentioned item (6), a timing at which the first control circuit starts a mode of acquiring the phase information may be set based on comparison between a combination of an inductance value of the module-side reference inductance element and a capacitance value of the reference capacitance element and a combination of an inductance value of the first module-side inductance element and a capacitance value of the first capacitance element.

(12) In the power generation system according to the above-mentioned item (5), a timing at which the second control circuit starts a mode of acquiring the phase information may be set based on comparison between a period of the reference AC current and a period calculated from an inductance value of the second module-side inductance element and a capacitance value of the second capacitance element.

(13) In the power generation system according to the above-mentioned item (2), the power collector-side reference inductance element and the first power collector-side inductance element may be connected to each other in series, and the power generation system may further include a switching element arranged between the power collector-side reference inductance element and the first power collector-side inductance element, the switching element being configured to switch a connection state between the power collector-side reference inductance element and the first power collector-side inductance element.

(14) In the power generation system according to the above-mentioned item (3), the first power collector-side inductance element and the second power collector-side inductance element may be connected to each other in series, and the power generation system may further include a switching element arranged between the first power collector-side inductance element and the second power collector-side inductance element, the switching element being configured to switch a connection state between the first power collector-side inductance element and the second power collector-side inductance element.

(15) In the power generation system according to the above-mentioned item (2), the power-collector closed circuit may further include an output terminal configured to output the induced electromotive force generated in the first power collector-side inductance element and the induced electromotive force generated in the power collector-side reference inductance element.

(16) In the power generation system according to the above-mentioned item (15), the power-collector closed circuit may further include a DC conversion circuit configured to convert the induced electromotive force generated in the first power collector-side inductance element and the induced electromotive force generated in the power collector-side reference inductance element into DC power.

(17) In the power generation system according to the above-mentioned item (3), the power-collector closed circuit may further include an output terminal configured to output the induced electromotive force generated in the first power collector-side inductance element and the induced electromotive force generated in the second power collector-side inductance element.

(18) In the power generation system according to the above-mentioned item (17), the power-collector closed circuit may further include a DC conversion circuit configured to convert the induced electromotive force generated in the first power collector-side inductance element and the induced electromotive force generated in the second power collector-side inductance element into DC power.

(19) In the power generation system according to the above-mentioned item (3), the reference AC wave generation source may be configured to generate the reference AC current with use of the induced electromotive force generated in at least one of the first power collector-side inductance element or the second power collector-side inductance element.

(20) A control method according to one embodiment of the present disclosure is a control method for a power generation system, the power generation system including: a first power generation module including: a first power generation element; a first AC generation circuit configured to convert a first DC current output from the first power generation element into a first AC current; a first module-side inductance element configured to generate a magnetic field from the first AC current; a first phase information acquiring circuit; and a first control circuit; and a power-collector closed circuit including a first power collector-side inductance element configured to electromagnetically couple to the first module-side inductance element to generate an induced electromotive force, the power generation system control method including the steps of: generating, when reference AC current flowing in the power-collector closed circuit flows through the first power collector-side inductance element, AC current corresponding to the reference AC current in the first power generation module by the first module-side inductance element electromagnetically coupled to the first power collector-side inductance element; acquiring, by the first control circuit, phase information related to the reference AC current via the first phase information acquiring circuit; and controlling, by the first control circuit, the first AC generation circuit in accordance with the phase information.

DESCRIPTION OF EMBODIMENTS

First Embodiment

A first embodiment of the present disclosure is described below with reference to the drawings.

[Power Generation System 100]

Figure 1:
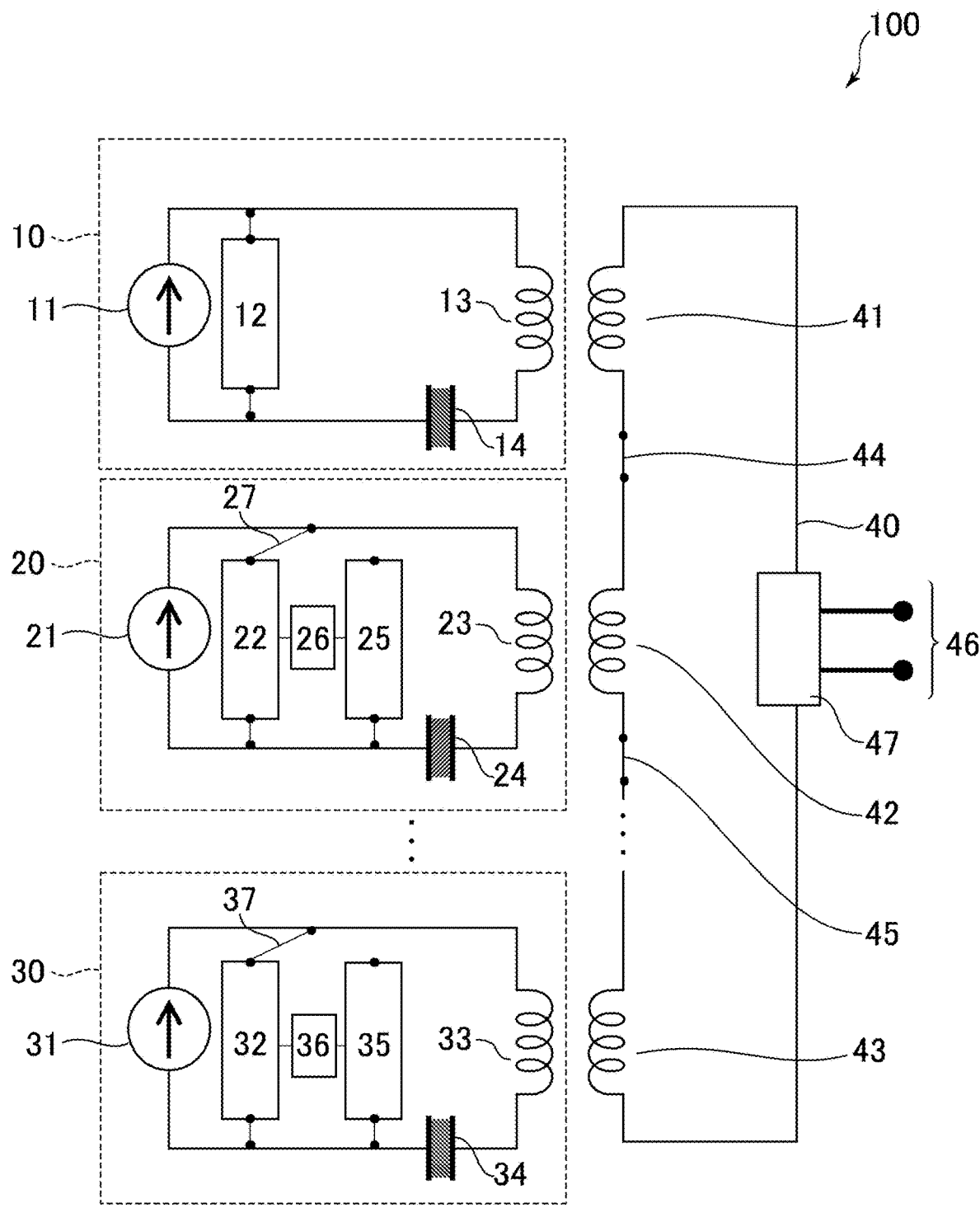
FIG. 1 is a schematic circuit diagram for illustrating a power generation system according to an embodiment of the present disclosure.

FIG. 1 is a schematic circuit diagram for illustrating a power generation system 100 according to the first embodiment.

As illustrated in FIG. 1, the power generation system 100 includes a power generation module group including a reference power generation module 10, a first power generation module 20, and a second power generation module 30, which are two-dimensionally arranged. The power generation system 100 further includes a power-collector closed circuit 40 configured to collect power generated by the power generation module group to output the collected power.

Each of the power generation modules includes a module-side inductance element configured to generate a magnetic field from AC current, and the power-collector closed circuit 40 includes a plurality of power collector-side inductance elements arranged close to the module-side inductance elements.

[Reference Power Generation Module 10]

The reference power generation module 10 includes a reference power generation element 11, a reference AC generation circuit 12 configured to convert reference DC current output from the reference power generation element 11 into reference AC current, and a module-side reference inductance element 13 configured to generate a magnetic field from the reference AC current. The reference AC generation circuit 12 is connected in parallel to the reference power generation element 11.

The reference power generation element 11 is, for example, a photovoltaic power generation element, and may be a single-crystal silicon solar cell, a polycrystalline silicon solar cell, a microcrystalline silicon solar cell, an amorphous silicon solar cell, or other cells. Other than those cells, the reference power generation element 11 may be a photovoltaic power generation element using gallium arsenide, CIS, or other compound semiconductor materials, or may a photovoltaic power generation element using an organic material. Further, the reference power generation element 11 may be a tandem-type photovoltaic power generation element obtained by laminating various semiconductor materials.

The reference AC generation circuit 12 includes, for example, a switching circuit so as to switch, at a predetermined frequency, a direction in which the reference power generation element 11 outputs the reference DC current. When the reference AC generation circuit 12 switches the direction in which the reference DC current is output, the reference DC current is converted into the AC current.

In the first embodiment, the switching of each of a first AC generation circuit 22 included in the first power generation module 20 and a second AC generation circuit 32 included in the second power generation module 30 is controlled based on a phase of the AC current generated by the reference AC generation circuit 12.

The module-side reference inductance element 13 is configured to generate a magnetic field when the AC current from the reference AC generation circuit 12 flows through the module-side reference inductance element 13, and to electromagnetically couple to a power collector-side reference inductance element 41 of the power-collector closed circuit 40.

The reference power generation module 10 of the first embodiment further includes a reference capacitance element 14. The reference capacitance element 14 is configured to cause resonance together with the first module-side reference inductance element 13.

In the first embodiment, the frequency at which the above-mentioned reference AC generation circuit 12 switches the direction in which the reference power generation element 11 outputs the reference DC power is set in advance in accordance with an inductance value of the module-side reference inductance element 13 and an electrostatic capacitance value of the reference capacitance element 14. That is, setting is made in advance so that, at a frequency corresponding to a resonant frequency determined based on the inductance value of the module-side reference inductance element 13 and the electrostatic capacitance value of the reference capacitance element 14, the reference AC generation circuit 12 switches the direction in which the reference power generation element 11 outputs the reference DC current.

[First Power Generation Module 20]

The first power generation module 20 has a configuration common to that of the above-mentioned reference power generation module 10, and includes a first power generation element 21, the first AC generation circuit 22 configured to convert a first DC current output from the first power generation element 21 into a first AC current, a first module-side inductance element 23 configured to generate a magnetic field when the first AC current flows through the first module-side inductance element 23, and to electromagnetically couple to a first power collector-side inductance element 42 of the power-collector closed circuit 40, and a first capacitance element 24 configured to cause resonance together with the first module-side inductance element 23.

The first power generation module 20 further includes, in addition to the above-mentioned configuration, a first phase information acquiring circuit 25, a first control circuit 26, and a first switching element 27. The first control circuit 26 is configured to control a switching operation of the first switching element 27 so as to switch a target to be connected in parallel to the first power generation element 21 between the first AC generation circuit 22 and the first phase information acquiring circuit 25. Specific operations of the first phase information acquiring circuit 25, the first control circuit 26, and the first switching element 27 are described later.

[Second Power Generation Module 30]

The second power generation module 30 has a configuration substantially the same as that of the above-mentioned first power generation module 20, and includes a second power generation element 31, the second AC generation circuit 32 configured to convert a second DC power output from the second power generation element 31 into a second AC power, a second module-side inductance element 33 configured to generate a magnetic field when the second AC power flows through the second module-side inductance element 33, and to electromagnetically couple to a second power collector-side inductance element 43 of the power-collector closed circuit 40, and a second capacitance element 34 configured to cause resonance together with the second module-side inductance element 33.

The second power generation module 30 further includes, in addition to the above-mentioned configuration, a second phase information acquiring circuit 35, a second control circuit 36, and a second switching element 37. The second control circuit 36 is configured to control a switching operation of the second switching element 37 so as to switch a target to be connected in parallel to the second power generation element 31 between the second AC generation circuit 32 and the second phase information acquiring circuit 35. Specific operations of the second phase information acquiring circuit 35, the second control circuit 36, and the second switching element 37 are described later.

[Power-Collector Closed Circuit 40]

The power-collector closed circuit 40 includes the power collector-side reference inductance element 41 configured to electromagnetically couple to the module-side reference inductance element 13 to generate an induced electromotive force and reference AC current in the power-collector closed circuit 40. The power-collector closed circuit 40 further includes the first power collector-side inductance element 42 configured to electromagnetically couple to the first module-side inductance element 23 to generate an induced electromotive force. The power-collector closed circuit 40 further includes the second power collector-side inductance element 43 configured to electromagnetically couple to the second module-side inductance element 33 to generate an induced electromotive force.

In the first embodiment, the power collector-side reference inductance element 41, the first power collector-side inductance element 42, and the second power collector-side inductance element 43 are connected in series in the power-collector closed circuit 40, and a sum of, for example, the induced electromotive force generated in the power collector-side reference inductance element 41, the induced electromotive force generated in the first power collector-side inductance element 42, and the induced electromotive force generated in the second power collector-side inductance element 43 is extracted from an output terminal 46 formed in the power-collector closed circuit 40. In the first embodiment, a DC conversion circuit 47 is formed at a preceding stage of the output terminal 46, and DC power can be extracted from the output terminal 46.

In the power-collector closed circuit 40, the power collector-side reference inductance element 41 generates the reference AC current from the generated induced electromotive force. The reference AC current circulates in the power-collector closed circuit 40, and flows also through the first power collector-side inductance element 42 and the second power collector-side inductance element 43. In the first power collector-side inductance element 42 and the second power collector-side inductance element 43, magnetic fields corresponding to the phase and the frequency of the reference AC current are generated.

In order to increase the power to be extracted from the output terminal 46, it is required to match the phases of the AC current generated in the power collector-side reference inductance element 41, the AC current generated in the first power collector-side inductance element 42, and the AC current generated in the second power collector-side inductance element 43. In the first embodiment, description is given below of an example of an operation to be performed by the power collector-side reference inductance element 41 configured to use phase information of the reference AC current generated from the induced electromotive force to match the phases of the AC current generated in the power collector-side reference inductance element 41, the AC current generated in the first power collector-side inductance element 42, and the AC current generated in the second power collector-side inductance element 43.

[Operation Example of Power Generation System 100]

Now, an operation example of the power generation system 100 is described. The operation of the power generation system 100 includes an initial mode in which the reference AC current is generated in the power-collector closed circuit 40, and a passive operation mode and an active operation mode to be carried out after the initial mode. In the passive operation mode, the first phase information acquiring circuit 25 included in the first power generation module 20 is caused to operate as a passive element. In the active operation mode, the first control circuit 26 included in the first power generation module 20 is caused to operate as an active element.

[Initial Mode]

In the initial mode, as described above, first, the reference AC generation circuit 12 included in the reference power generation module 10 switches the direction in which the reference power generation element 11 outputs the reference DC current at a predetermined frequency to convert the reference DC current into AC current. Next, the module-side reference inductance element 13 generates a magnetic field from the AC current generated by the reference AC generation circuit 12. As a result, the module-side reference inductance element 13 and the power collector-side reference inductance element 41 included in the power-collector closed circuit 40 are electromagnetically coupled to each other. With this electromagnetic coupling, the power collector-side reference inductance element 41 generates an induced electromotive force. Further, the power collector-side reference inductance element 41 generates reference AC current as an induced current. The reference AC current includes the phase information and frequency information. When the reference AC current is circulated in the power-collector closed circuit 40, magnetic fields corresponding to the reference AC current are also generated in the first power collector-side inductance element 42 and the second power collector-side inductance element 43, which are included in the power-collector closed circuit 40.

[Passive Operation Mode]

In the passive operation mode, the first control circuit 26 switches a connection destination of the first switching element 27 from the first AC generation circuit 22 to the first phase information acquiring circuit 25 so that the first phase information acquiring circuit 25 is brought into a state in which the first phase information acquiring circuit 25 is connected in parallel to the first power generation element 21 and the first module-side inductance element 23.

Similarly, the second control circuit 36 switches a connection destination of the second switching element 37 from the second AC generation circuit 32 to the second phase information acquiring circuit 35 so that the second phase information acquiring circuit 35 is brought into a state in which the second phase information acquiring circuit 35 is connected in parallel to the second power generation element 31 and the second module-side inductance element 33.

In the passive operation mode, first, in the power-collector closed circuit 40, the reference AC current flowing in the power-collector closed circuit 40 flows through the first power collector-side inductance element 42 so that the first module-side inductance element 23 electromagnetically coupled to the first power collector-side inductance element 42 generates AC current corresponding to the reference AC current in the first power generation module 20.

Similarly, the reference AC current flowing in the power-collector closed circuit 40 flows through the second power collector-side inductance element 43 so that the second module-side inductance element 33 electromagnetically coupled to the second power collector-side inductance element 43 generates AC current corresponding to the reference AC current in the second power generation module 30.

The AC current corresponding to the reference AC current is circulated in each of the first power generation module 20 and the second power generation module 30.

The first phase information acquiring circuit 25 included in the first power generation module 20 and the second phase information acquiring circuit 35 included in the second power generation module 30 each include, for example, an ammeter or a voltmeter. The first control circuit 26 detects the change in value of current flowing through the first phase information acquiring circuit 25 or the change in voltage value caused by the change in current value to acquire the phase information. Similarly, the second control circuit 36 detects the change in value of current flowing through the second phase information acquiring circuit 35 or the change in voltage value caused by the change in current value to acquire the phase information.

In the passive operation mode, each of the first phase information acquiring circuit 25 and the second phase information acquiring circuit 35 functions as a passive element.

The passive operation mode is a mode for the first control circuit 26 to acquire the phase information related to the above-mentioned reference AC current via the first phase information acquiring circuit 25, and also a mode for the second control circuit 36 to acquire the phase information related to the above-mentioned reference AC current via the second phase information acquiring circuit 35.

In the passive operation mode, in the first embodiment, description has been given as an example of a configuration in which the first control circuit 26 acquires the phase information related to the reference AC current via the first phase information acquiring circuit 25, and the second control circuit 36 acquires the phase information related to the reference AC current via the second phase information acquiring circuit 35. However, there may be employed a configuration in which each of the first control circuit 26 and the second control circuit 36 acquires not only the phase information related to the reference AC current but also the frequency information related to the reference AC current.

The timing to switch the mode from the above-mentioned initial mode to the passive operation mode, that is, the timing at which the first control circuit 26 and the second control circuit 36 start acquisition of the phase information can be set to, for example, a time point at which a predetermined period has elapsed in the initial mode.

Specifically, the timing at which the first control circuit 26 switches the mode from the initial mode to the passive operation mode can be set based on comparison between, for example, a combination of the inductance value of the module-side reference inductance element 13 and the capacitance value of the reference capacitance element 14 and a combination of the inductance value of the first module-side inductance element 23 and the capacitance value of the first capacitance element 24. For example, when there is a large difference between a product of the inductance value of the module-side reference inductance element 13 and the capacitance value of the reference capacitance element 14 and a product of the inductance value of the first module-side inductance element 23 and the capacitance value of the first capacitance element 24, a difference between a period of the AC current generated in the reference power generation module 10 and a period of the AC current generated in the first power generation module 20 is increased. Therefore, the mode is frequently required to be switched to the passive operation mode so that the phase of the AC current to be generated in the first power generation module 20 matches the phase related to the reference AC current. Therefore, when the above-mentioned difference is large, a period until the mode is switched from the initial mode to the passive operation mode is set to be short, and when the difference is small, the period until the mode is switched from the initial mode to the passive operation mode is set to be long.

Similarly, the timing at which the second control circuit 36 switches the mode from the initial mode to the passive operation mode can be set based on comparison between, for example, a combination of the inductance value of the module-side reference inductance element 13 and the capacitance value of the reference capacitance element 14 and a combination of the inductance value of the second module side inductance element 33 and the capacitance value of the second capacitance element 34. When the difference therebetween is large, a period until the mode is switched from the initial mode to the passive operation mode is set to be short, and when the difference is small, the period until the mode is switched from the initial mode to the passive operation mode is set to be long.

[Active Operation Mode]

After the first control circuit 26 acquires the phase information related to the reference AC current via the first phase information acquiring circuit 25 in the passive operation mode, the first control circuit 26 starts the active operation mode. Specifically, the first control circuit 26 switches the connection destination of the first switching element 27 from the first phase information acquiring circuit 25 to the first AC generation circuit 22 so that the first AC generation circuit 22 is brought into a state in which the first AC generation circuit 22 is connected in parallel to the first power generation element 21 and the first module-side inductance element 23.

The first control circuit 26 controls the switching operation of the first AC generation circuit 22 in the first power generation module 20 in accordance with the phase information related to the reference AC current, which is acquired via the first phase information acquiring circuit 25 in the passive operation mode.

Similarly, after the second control circuit 36 acquires the phase information related to the reference AC current via the second phase information acquiring circuit 35 in the passive operation mode, the second control circuit 36 starts the active operation mode. Specifically, the second control circuit 36 switches the connection destination of the second switching element 37 from the second phase information acquiring circuit 35 to the second AC generation circuit 32 so that the second AC generation circuit 32 is brought into a state in which the second AC generation circuit 32 is connected in parallel to the second power generation element 31 and the second module-side inductance element 33.

The second control circuit 36 controls the switching operation of the second AC generation circuit 32 in the second power generation module 30 in accordance with the phase information related to the reference AC current, which is acquired via the second phase information acquiring circuit 35 in the passive operation mode.

With the above-mentioned configuration and operation, the power generation system 100 according to the first embodiment can synchronize the phase of the switching operation of the first AC generation circuit 22 included in the first power generation module 20 and the phase of the switching operation of the second AC generation circuit 32 included in the second power generation module 30 with the phase related to the reference AC current. As a result, the power generation system 100 according to the first embodiment can control the phase of each power generation module by a simple method.

In the passive operation mode, when the first control circuit 26 acquires not only the phase information related to the reference AC current but also the frequency information related to the reference AC current via the first phase information acquiring circuit 25, it is desired to use a capacitance element having a variable capacitance value as the first capacitance element 24. With such a configuration, even when the inductance value of the module-side reference inductance element 13 and the capacitance value of the reference capacitance element 14 in the reference power generation module 10 are deviated from the inductance value of the first module-side inductance element 23 and the capacitance value of the first capacitance element 24 in the first power generation module 20 due to the influence of temperature or the like, the capacitance value of the first capacitance element 24 may be adjusted so that the resonant frequency in the reference power generation module 10 and the resonant frequency in the first power generation module 20 can be brought close to each other. That is, the first control circuit 26 can acquire the frequency information related to the reference AC current from the first phase information acquiring circuit 25, and can control the capacitance value of the first capacitance element 24 in accordance with the acquired frequency information so that the resonant frequency in the reference power generation module 10, which is determined based on the product of the inductance value and the capacitance value, and the resonant frequency in the first power generation module 20 can be brought close to each other.

Similarly, in the passive operation mode, when the second control circuit 36 acquires not only the phase information related to the reference AC current but also the frequency information related to the reference AC current via the second phase information acquiring circuit 35, it is desired to use a capacitance element having a variable capacitance value as the second capacitance element 34. With such a configuration, even when the inductance value of the module-side reference inductance element 13 and the capacitance value of the reference capacitance element 14 in the reference power generation module 10 are deviated from the inductance value of the second module-side inductance element 33 and the capacitance value of the second capacitance element 34 in the second power generation module 30 due to the influence of temperature or the like, the capacitance value of the second capacitance element 34 may be adjusted so that the resonant frequency in the reference power generation module 10 and the resonant frequency in the second power generation module 30 can be brought close to each other. That is, the second control circuit 36 can acquire the frequency information related to the reference AC current from the second phase information acquiring circuit 35, and can control the capacitance value of the second capacitance element 34 in accordance with the acquired frequency information so that the resonant frequency in the reference power generation module 10, which is determined based on the product of the inductance value and the capacitance value, and the resonant frequency in the second power generation module 30 can be brought close to each other.

Further, in the first embodiment, as illustrated in FIG. 1, a switching element 44 is connected between the power collector-side reference inductance element 41 and the first power collector-side inductance element 42, which are included in the power-collector closed circuit 40, and a switching element 45 is connected between the first power collector-side inductance element 42 and the second power collector-side inductance element 43. The switching element 44 can switch a connection state between the power collector-side reference inductance element 41 and the first power collector-side inductance element 42, and the switching element 45 can switch a connection state between the first power collector-side inductance element 42 and the second power collector-side inductance element 43.

With such a configuration, when any abnormality occurs in the power generation system 100, the connection between the power collector-side inductance elements connected in series in the power-collector closed circuit 40 can be disconnected. As a result, when abnormality occurs, generation of a high voltage can be suppressed in the power-collector closed circuit 40.

Figure 2:
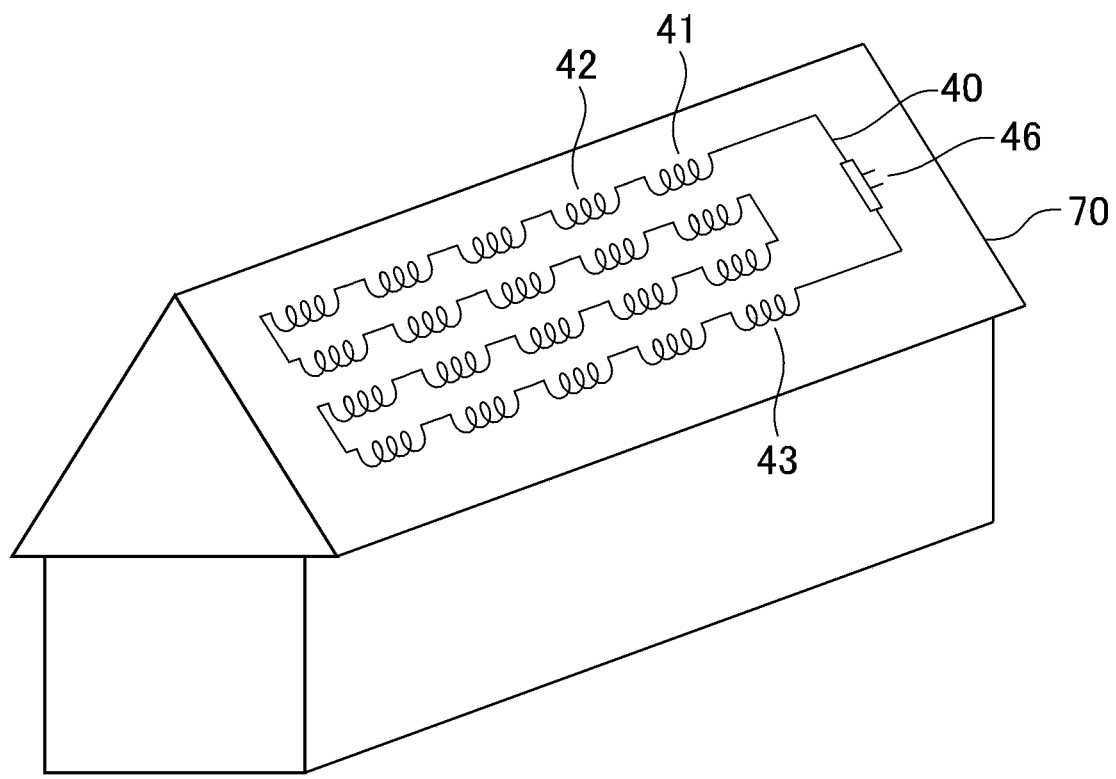
FIG. 2 is a schematic view for illustrating a state in which a closed circuit of the power generation system according to the embodiment is mounted on a roof.

When such a power generation system 100 is arranged on, for example, a roof of a residence, as illustrated in FIG. 2, the power-collector closed circuit 40 is first arranged on a roof 70 or an indoor side of a roof surface. Then, the reference power generation module 10, the first power generation module 20, and the second power generation module 30 are arranged so that the module-side reference inductance element 13 included in the reference power generation module 10 is brought close to the power collector-side reference inductance element 41, the first module-side inductance element 23 included in the first power generation module 20 is brought close to the first power collector-side inductance element 42, and the second module-side inductance element 33 included in the second power generation module 30 is brought close to the second power collector-side inductance element 43. With such an arrangement, the above-mentioned module-side inductance elements and power collector-side inductance elements can be electromagnetically coupled to each other. When the configuration in which the power-collector closed circuit 40 is arranged on the indoor side of the roof surface is employed, deterioration of the power-collector closed circuit 40 can be suppressed.

More specifically, the module-side reference inductance element 13 is connected on the back surface side of the reference power generation element 11 of the reference power generation module 10, and the back surface side of the reference power generation module 10 having the module-side reference inductance element 13 arranged thereon is arranged above the power collector-side reference inductance element 41. Similarly, the first module-side inductance element 23 is connected on the back surface side of the first power generation element 21 of the first power generation module 20, and the back surface side of the first power generation module 20 having the first module-side inductance element 23 arranged thereon is arranged above the first power collector-side inductance element 42. Similarly, the second module-side inductance element 33 is connected on the back surface side of the second power generation element 31 of the second power generation module 30, and the back surface side of the second power generation module 30 having the second module-side inductance element 33 arranged thereon is arranged above the second power collector-side inductance element 43.

In the first embodiment, description has been given as an example of the configuration in which the power collector-side reference inductance element 41, the first power collector-side inductance element 42, and the second power collector-side inductance element 43, which are included in the power-collector closed circuit 40, are connected to each other in series, but there may be employed a configuration in which the power collector-side inductance elements are connected to each other in parallel.

There may also be employed a configuration in which each of the reference power generation module 10, the first power generation module 20, and the second power generation module 30 includes a resistance component.

Second Embodiment

A second embodiment of the present disclosure is described below with reference to the drawings. Configurations similar to those of the first embodiment are denoted by the same reference symbols, and description thereof is omitted herein.

[Power Generation System 100A]

Figure 3:
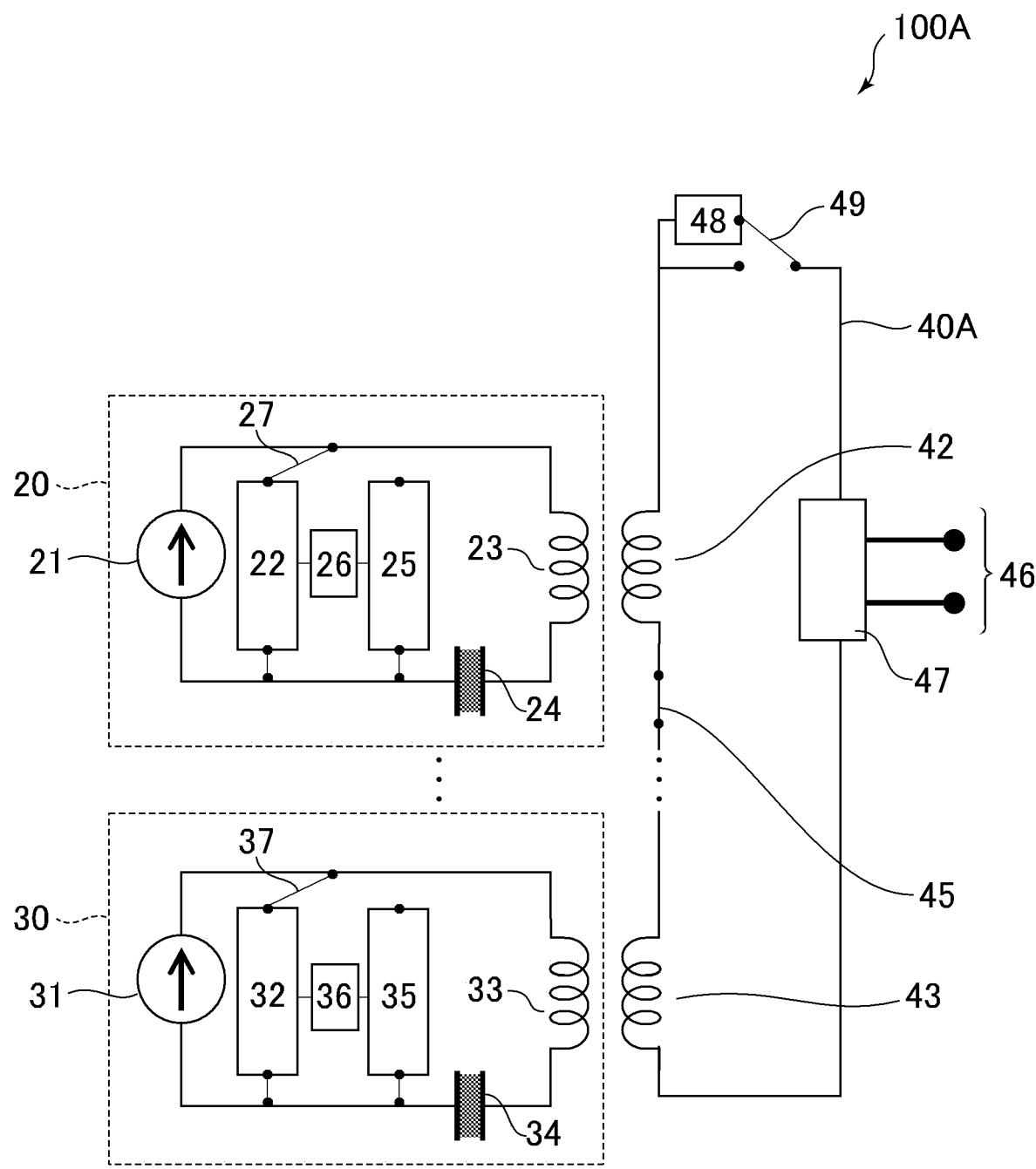
FIG. 3 is a schematic circuit diagram for illustrating a power generation system according to an embodiment of the present disclosure.

FIG. 3 is a schematic circuit diagram for illustrating a power generation system 100A according to the second embodiment.

As illustrated in FIG. 3, the power generation system 100A includes a power generation module group including the first power generation module 20, and the second power generation module 30, which are two-dimensionally arranged. The power generation system 100A further includes a power-collector closed circuit 40A configured to collect power generated by the power generation module group to output the collected power.

Each of the power generation modules includes a module-side inductance element configured to generate a magnetic field from AC current, and the power-collector closed circuit 40A includes a plurality of power collector-side inductance elements arranged close to the module-side inductance elements.

[First Power Generation Module 20]

The first power generation module 20 includes the first power generation element 21, the first AC generation circuit 22 configured to convert a first DC power output from the first power generation element 21 into a first AC power, the first module-side inductance element 23 configured to generate a magnetic field when the first AC current flows through the first module-side inductance element 23, and to electromagnetically couple to the first power collector-side inductance element 42 of the power-collector closed circuit 40A, and the first capacitance element 24 configured to cause resonance together with the first module-side inductance element 23.

The first power generation module 20 further includes, in addition to the above-mentioned configuration, the first phase information acquiring circuit 25, the first control circuit 26, and the first switching element 27. The first control circuit 26 is configured to control a switching operation of the first switching element 27 so as to switch a target to be connected in parallel to the first power generation element 21 between the first AC generation circuit 22 and the first phase information acquiring circuit 25. Specific operations of the first phase information acquiring circuit 25, the first control circuit 26, and the first switching element 27 are described later.

In the second embodiment, the frequency at which the above-mentioned first AC generation circuit 22 switches the direction in which the first power generation element 21 outputs the first DC power is set in advance in accordance with an inductance value of the first module-side inductance element 23 and an electrostatic capacitance value of the first capacitance element 24. That is, setting is made in advance so that, at a frequency corresponding to a resonant frequency determined based on the inductance value of the first module-side inductance element 23 and the electrostatic capacitance value of the first capacitance element 24, the first AC generation circuit 22 switches the direction in which the first power generation element 21 outputs the first DC power.

[Second Power Generation Module 30]

The second power generation module 30 includes the second power generation element 31, the second AC generation circuit 32 configured to convert a second DC power output from the second power generation element 31 into a second AC power, the second module-side inductance element 33 configured to generate a magnetic field when the second AC current flows through the second module-side inductance element 33, and to electromagnetically couple to the second power collector-side inductance element 43 of the power-collector closed circuit 40A, and the second capacitance element 34 configured to cause resonance together with the second module-side inductance element 33.

The second power generation module 30 further includes, in addition to the above-mentioned configuration, the second phase information acquiring circuit 35, the second control circuit 36, and the second switching element 37. The second control circuit 36 is configured to control a switching operation of the second switching element 37 so as to switch a target to be connected in parallel to the second power generation element 31 between the second AC generation circuit 32 and the second phase information acquiring circuit 35. Specific operations of the second phase information acquiring circuit 35, the second control circuit 36, and the second switching element 37 are described later.

In the second embodiment, the frequency at which the above-mentioned second AC generation circuit 32 switches the direction in which the second power generation element 31 outputs the second DC power is set in advance in accordance with an inductance value of the second module-side inductance element 33 and an electrostatic capacitance value of the second capacitance element 34. That is, setting is made in advance so that, at a frequency corresponding to a resonant frequency determined based on the inductance value of the second module-side inductance element 33 and the electrostatic capacitance value of the second capacitance element 34, the second AC generation circuit 32 switches the direction in which the second power generation element 31 outputs the second DC power.

[Power-Collector Closed Circuit 40A]

The power-collector closed circuit 40A further includes the first power collector-side inductance element 42 configured to electromagnetically couple to the first module-side inductance element 23 to generate an induced electromotive force. The power-collector closed circuit 40A further includes the second power collector-side inductance element 43 configured to electromagnetically couple to the second module-side inductance element 33 to generate an induced electromotive force.

In the second embodiment, the first power collector-side inductance element 42 and the second power collector-side inductance element 43 are connected in series in the power-collector closed circuit 40A, and a sum of the induced electromotive force generated in the first power collector-side inductance element 42 and the induced electromotive force generated in the second power collector-side inductance element is extracted from the output terminal 46 formed in the power-collector closed circuit 40A. In the second embodiment, the DC conversion circuit 47 is formed at the preceding stage of the output terminal 46, and DC power can be extracted from the output terminal 46.

There may be employed a configuration in which, when the induced electromotive force generated in the first power collector-side inductance element 42 and the induced electromotive force generated in the second power collector-side inductance element 43 are to be collected, the power-collector closed circuit 40A switches a connection destination of a switching element 49 so that a reference AC wave generation source 48 to be described later is prevented from being included in the power-collector closed circuit 40A. In FIG. 3, a control circuit configured to control the switching operation of the switching element 49 is not shown, but there may be employed a configuration in which the power-collector closed circuit 40A additionally includes a control circuit configured to control the switching operation of the switching element 49.

Further, in the second embodiment, the power-collector closed circuit 40A includes the reference AC wave generation source 48. The reference AC wave generation source 48 can be implemented by including, for example, switching elements. In the second embodiment, AC current to be generated by the reference AC wave generation source 48 is the reference AC current. When the reference AC wave generation source 48 generates the reference AC current, the reference AC wave generation source 48 switches the connection destination of the switching element 49 so that the reference AC wave generation source 48 is included in the power-collector closed circuit 40A.

The reference AC wave generation source 48 uses the induced electromotive forces generated in the first power collector-side inductance element 42 and the second power collector-side inductance element 43 to generate the reference AC current. Specifically, in the power-collector closed circuit 40A, the first power collector-side inductance element 42 is electromagnetically coupled to the first module-side inductance element 23 so that the induced electromotive force is generated in the first power collector-side inductance element 42. Similarly, the second power collector-side inductance element 43 is electromagnetically coupled to the second module-side inductance element 33 so that the induced electromotive force is generated in the second power collector-side inductance element 43. With use of at least one of the induced electromotive force generated in the first power collector-side inductance element 42 or the induced electromotive force generated in the second power collector-side inductance element 43, the reference AC wave generation source 48 generates the reference AC current by performing the switching operation.

The reference AC current generated by the reference AC wave generation source 48 circulates in the power-collector closed circuit 40A to flow also through the first power collector-side inductance element 42 and the second power collector-side inductance element 43. Along with the circulation of the reference AC current, in the first power collector-side inductance element 42 and the second power collector-side inductance element 43, magnetic fields corresponding to the phase and the frequency of the reference AC current are generated.

In order to increase the power to be extracted from the output terminal 46, it is required to match the phases of the AC current generated in the first power collector-side inductance element 42 and the AC current generated in the second power collector-side inductance element 43. In the second embodiment, description is given below of an example of an operation to be performed to match the phases of the AC current generated in the first power collector-side inductance element 42 and the AC current generated in the second power collector-side inductance element 43 with use of phase information of the reference AC current generated by the reference AC wave generation source 48.

[Operation Example of Power Generation System 100A]

Now, an operation example of the power generation system 100A is described. The operation of the power generation system 100A includes an initial mode in which the reference AC wave generation source 48 generates the reference AC current in the power-collector closed circuit 40A, and a passive operation mode and an active operation mode to be carried out after the initial mode. In the passive operation mode, the first phase information acquiring circuit 25 included in the first power generation module 20 and the second phase information acquiring circuit 35 included in the second power generation module 30 are caused to operate as passive elements. In the active operation mode, the first control circuit 26 included in the first power generation module 20 and the second control circuit 36 included in the second power generation module 30 are caused to operate as active elements.

[Initial Mode]

In the initial mode, as described above, first, the first AC generation circuit 22 included in the first power generation module 20 switches the direction in which the first power generation element 21 outputs the first DC current at a predetermined frequency to convert the first DC current into AC current. Next, the first module-side inductance element 23 generates a magnetic field from the AC current generated by the first AC generation circuit 22. As a result, the first module-side inductance element 23 and the first power collector-side inductance element 42 included in the power-collector closed circuit 40A are electromagnetically coupled to each other. With this electromagnetic coupling, the first power collector-side inductance element 42 generates an induced electromotive force.

Similarly, the second AC generation circuit 32 included in the second power generation module 30 switches the direction in which the second power generation element 31 outputs the second DC current at a predetermined frequency to convert the second DC current into AC current. Next, the second module-side inductance element 33 generates a magnetic field from the AC current generated by the second AC generation circuit 32. As a result, the second module-side inductance element 33 and the second power collector-side inductance element 43 included in the power-collector closed circuit 40A are electromagnetically coupled to each other. With this electromagnetic coupling, the second power collector-side inductance element 43 generates an induced electromotive force.

In the initial mode, the switching element 49 is connected to the reference AC wave generation source 48, and the reference AC wave generation source 48 is included in the power-collector closed circuit 40A. The AC current is generated in the power-collector closed circuit 40A from the induced electromotive forces generated in the first power collector-side inductance element 42 and the second power collector-side inductance element 43. The reference AC wave generation source 48 generates the reference AC current by the switching operation performed with respect to the AC current. That is, the reference AC wave generation source 48 uses the induced electromotive forces generated in the first power collector-side inductance element 42 and the second power collector-side inductance element 43 to generate the reference AC current.

In the second embodiment, description has been given as an example of the following configuration. That is, both of the first power generation module 20 and the second power generation module 30 are activated, and the induced electromotive forces are generated in both of the first power collector-side inductance element 42 and the second power collector-side inductance element 43. With use of those induced electromotive forces, the reference AC wave generation source 48 generates the reference AC current. However, there may be employed a configuration in which at least one of the power generation modules is activated, and the reference AC wave generation source 48 generates the reference AC current with use of the induced electromotive force generated in at least one of the power collector-side inductance elements.

Alternatively, there may be employed a configuration in which, without activating the first power generation module 20 and the second power generation module 30, for example, current source is additionally provided in the power-collector closed circuit 40A so that the reference AC wave generation source 48 generates the reference AC current by performing the switching operation with respect to the current generated from the current source. However, the configuration in which the reference AC wave generation source 48 uses the induced electromotive force generated in at least one of the first power collector-side inductance element 42 or the second power collector-side inductance element 43 when the reference AC wave generation source 48 generates the reference AC current is more desired in terms of circuit design because another current source or the like is not required to be provided in the power-collector closed circuit 40A. Further, it is more desired to employ the configuration in which energy generated by the first power generation module 20 or the second power generation module 30 is used for the generation of the reference AC current from the viewpoint of global environment preservation because the generated energy can be efficiently used.

The reference AC current generated by the reference AC wave generation source 48 includes the phase information and the frequency information. Through the circulation of the reference AC current in the power-collector closed circuit 40A, magnetic fields corresponding to the reference AC current are generated also in the first power collector-side inductance element 42 and the second power collector-side inductance element 43, which are included in the power-collector closed circuit 40A.

[Passive Operation Mode]

In the passive operation mode, the first control circuit 26 switches a connection destination of the first switching element 27 from the first AC generation circuit 22 to the first phase information acquiring circuit 25 so that the first phase information acquiring circuit 25 is brought into a state in which the first phase information acquiring circuit 25 is connected in parallel to the first power generation element 21 and the first module-side inductance element 23.

Similarly, in the passive operation mode, the second control circuit 36 switches a connection destination of the second switching element 37 from the second AC generation circuit 32 to the second phase information acquiring circuit 35 so that the second phase information acquiring circuit 35 is brought into a state in which the second phase information acquiring circuit 35 is connected in parallel to the second power generation element 31 and the second module-side inductance element 33.

In the passive operation mode, first, in the power-collector closed circuit 40A, the reference AC current flowing in the power-collector closed circuit 40A flows through the first power collector-side inductance element 42 so that the first module-side inductance element 23 electromagnetically coupled to the first power collector-side inductance element 42 generates AC current corresponding to the reference AC current in the first power generation module 20.

Similarly, the reference AC current flowing in the power-collector closed circuit 40A flows through the second power collector-side inductance element 43 so that the second module-side inductance element 33 electromagnetically coupled to the second power collector-side inductance element 43 generates AC current corresponding to the reference AC current in the second power generation module 30.

The AC current corresponding to the reference AC current is circulated in each of the first power generation module 20 and the second power generation module 30.

The first phase information acquiring circuit 25 included in the first power generation module 20 and the second phase information acquiring circuit 35 included in the second power generation module 30 each include, for example, an ammeter or a voltmeter. The first control circuit 26 detects the change in value of current flowing through the first phase information acquiring circuit 25 or the change in voltage value caused by the change in current value to acquire the phase information. Similarly, the second control circuit 36 detects the change in value of current flowing through the second phase information acquiring circuit 35 or the change in voltage value caused by the change in current value to acquire the phase information.

In the passive operation mode, each of the first phase information acquiring circuit 25 and the second phase information acquiring circuit 35 functions as a passive element. The passive operation mode is a mode for the first control circuit 26 to acquire the phase information related to the above-mentioned reference AC current via the first phase information acquiring circuit 25, and also a mode for the second control circuit 36 to acquire the phase information related to the above-mentioned reference AC current via the second phase information acquiring circuit 35.

In the passive operation mode, in the second embodiment, description has been given as an example of a configuration in which the first control circuit 26 acquires the phase information related to the reference AC current via the first phase information acquiring circuit 25, and the second control circuit 36 acquires the phase information related to the reference AC current via the second phase information acquiring circuit 35. However, there may be employed a configuration in which each of the first control circuit 26 and the second control circuit 36 acquires not only the phase information related to the reference AC current but also the frequency information related to the reference AC current.

The timing to switch the mode from the above-mentioned initial mode to the passive operation mode, that is, the timing at which the first control circuit 26 and the second control circuit 36 start acquisition of the phase information can be set to, for example, a time point at which a predetermined period has elapsed in the initial mode.

Specifically, the timing at which the first control circuit 26 switches the mode from the initial mode to the passive operation mode can be set based on comparison between, for example, the period of the reference AC current generated by the reference AC wave generation source 48 and the period calculated from the inductance value of the first module-side inductance element 23 and the capacitance value of the first capacitance element 24. For example, when there is a large difference between the period of the reference AC current and the period calculated from the inductance value of the first module-side inductance element 23 and the capacitance value of the first capacitance element 24, the mode is frequently required to be switched to the passive operation mode so that the phase of the reference AC current matches the phase of the AC current generated in the first power generation module 20. Therefore, when the above-mentioned difference is large, a period until the mode is switched from the initial mode to the passive operation mode is set to be short, and when the difference is small, the period until the mode is switched from the initial mode to the passive operation mode is set to be long.

Similarly, the timing at which the second control circuit 36 switches the mode from the initial mode to the passive operation mode can be set based on comparison between, for example, the period of the reference AC current generated by the reference AC wave generation source 48 and the period calculated from the inductance value of the second module-side inductance element 33 and the capacitance value of the second capacitance element 34. When the difference between the periods is large, a period until the mode is switched from the initial mode to the passive operation mode is set to be short, and when the difference is small, the period until the mode is switched from the initial mode to the passive operation mode is set to be long.

[Active Operation Mode]

After the first control circuit 26 acquires the phase information related to the reference AC current via the first phase information acquiring circuit 25 in the passive operation mode, the first control circuit 26 starts the active operation mode. Specifically, the first control circuit 26 switches the connection destination of the first switching element 27 from the first phase information acquiring circuit 25 to the first AC generation circuit 22 so that the first AC generation circuit 22 is brought into a state in which the first AC generation circuit 22 is connected in parallel to the first power generation element 21 and the first module-side inductance element 23.

The first control circuit 26 controls the switching operation of the first AC generation circuit 22 in the first power generation module 20 in accordance with the phase information related to the reference AC current, which is acquired via the first phase information acquiring circuit 25 in the passive operation mode.

Similarly, after the second control circuit 36 acquires the phase information related to the reference AC current via the second phase information acquiring circuit 35 in the passive operation mode, the second control circuit 36 starts the active operation mode. Specifically, the second control circuit 36 switches the connection destination of the second switching element 37 from the second phase information acquiring circuit 35 to the second AC generation circuit 32 so that the second AC generation circuit 32 is brought into a state in which the second AC generation circuit 32 is connected in parallel to the second power generation element 31 and the second module-side inductance element 33.

The second control circuit 36 controls the switching operation of the second AC generation circuit 32 in the second power generation module 30 in accordance with the phase information related to the reference AC current, which is acquired via the second phase information acquiring circuit 35 in the passive operation mode.

With the above-mentioned configuration and operation, the power generation system 100A according to the second embodiment can synchronize the phase of the switching operation of the first AC generation circuit 22 included in the first power generation module 20 and the phase of the switching operation of the second AC generation circuit 32 included in the second power generation module 30 with the phase of the reference AC current. As a result, the power generation system 100A according to the second embodiment can control the phase of each power generation module by a simple method.

In the passive operation mode, when the first control circuit 26 acquires not only the phase information related to the reference AC current but also the frequency information related to the reference AC current via the first phase information acquiring circuit 25, it is desired to use a capacitance element having a variable capacitance value as the first capacitance element 24. With such a configuration, even when the inductance value of the first module-side inductance element 23 and the capacitance value of the first capacitance element 24 in the first power generation module 20 are deviated from desired values due to the influence of temperature or the like, the capacitance value of the first capacitance element 24 may be adjusted so that the resonant frequency in the first power generation module 20 can be brought close to the frequency of the reference AC current. That is, the first control circuit 26 can acquire the frequency information related to the reference AC current from the first phase information acquiring circuit 25, and can control the capacitance value of the first capacitance element 24 in accordance with the acquired frequency information so that the resonant frequency in the first power generation module 20, which is determined based on the product of the inductance value and the capacitance value, can be brought close to the frequency of the reference AC current.

Similarly, in the passive operation mode, when the second control circuit 36 acquires not only the phase information related to the reference AC current but also the frequency information related to the reference AC current via the second phase information acquiring circuit 35, it is desired to use a capacitance element having a variable capacitance value as the second capacitance element 34. With such a configuration, even when the inductance value of the second module-side inductance element 33 and the capacitance value of the second capacitance element 34 in the second power generation module 30 are deviated from desired values due to the influence of temperature or the like, the capacitance value of the second capacitance element 34 may be adjusted so that the resonant frequency in the second power generation module 30 can be brought close to the frequency of the reference AC current. That is, the second control circuit 36 can acquire the frequency information related to the reference AC current from the second phase information acquiring circuit 35, and can control the capacitance value of the second capacitance element 34 in accordance with the acquired frequency information so that the resonant frequency in the second power generation module 30, which is determined based on the product of the inductance value and the capacitance value, can be brought close to the frequency of the reference AC current.

Also in the second embodiment, similarly to the first embodiment, it is desired to connect the switching element 45 between the first power collector-side inductance element 42 and the second power collector-side inductance element 43, which are included in the power-collector closed circuit 40A. The switching element 45 can switch the connection state between the first power collector-side inductance element 42 and the second power collector-side inductance element 43.

With such a configuration, when any abnormality occurs in the power generation system 100A, the connection between the power collector-side inductance elements connected in series in the power-collector closed circuit 40A can be disconnected. As a result, when abnormality occurs, generation of a high voltage can be suppressed in the power-collector closed circuit 40A.

In the second embodiment, description has been given as an example of the configuration in which the first power collector-side inductance element 42 and the second power collector-side inductance element 43, which are included in the power-collector closed circuit 40A, are connected to each other in series, but there may be employed a configuration in which the power collector-side inductance elements are connected to each other in parallel.

There may also be employed a configuration in which each of the first power generation module 20 and the second power generation module 30 includes a resistance component.

The invention claimed is:

1. A power generation system, comprising
a first power generation module including:
a first power generation element;
a first AC generation circuit configured to convert a first DC current output from the first power generation element into a first AC current;
a first module-side inductance element configured to generate a magnetic field from the first AC current;
a first phase information acquiring circuit; and
a first control circuit; and
a power-collector closed circuit including a first power collector-side inductance element configured to electromagnetically couple to the first module-side inductance element to generate an induced electromotive force,
wherein, when a reference AC current flowing in the power-collector closed circuit flows through the first power collector-side inductance element, the first module-side inductance element electromagnetically coupled to the first power collector-side inductance element generates an AC current corresponding to the reference AC current in the first power generation module, and the first control circuit acquires phase information related to the reference AC current via the first phase information acquiring circuit so that the first control circuit controls the first AC generation circuit in accordance with the phase information.

2. The power generation system according to claim 1, further comprising a reference power generation module including:
a reference power generation element;
a reference AC generation circuit configured to convert a reference DC current output from the reference power generation element into an AC current; and
a module-side reference inductance element configured to generate a magnetic field from the AC current,
wherein the power-collector closed circuit further includes a power collector-side reference inductance element configured to electromagnetically couple to the module-side reference inductance element to generate an induced electromotive force and the reference AC current in the power-collector closed circuit.

3. The power generation system according to claim 2, wherein the reference power generation module further includes a reference capacitance element configured to cause resonance together with the module-side reference inductance element.

4. The power generation system according to claim 2, wherein the power collector-side reference inductance element and the first power collector-side inductance element are connected to each other in series, and
wherein the power generation system further comprises a switching element arranged between the power collector-side reference inductance element and the first power collector-side inductance element, the switching element being configured to switch a connection state between the power collector-side reference inductance element and the first power collector-side inductance element.

5. The power generation system according to claim 2, wherein the power-collector closed circuit further includes an output terminal configured to output the induced electromotive force generated in the first power collector-side inductance element and the induced electromotive force generated in the power collector-side reference inductance element.

6. The power generation system according to claim 5, wherein the power-collector closed circuit further includes a DC conversion circuit configured to convert the induced electromotive force generated in the first power collector-side inductance element and the induced electromotive force generated in the power collector-side reference inductance element into DC power.

7. The power generation system according to claim 1, further comprising a second power generation module including:
a second power generation element;
a second AC generation circuit configured to convert a second DC current output from the second power generation element into a second AC current;
a second module-side inductance element configured to generate a magnetic field from the second AC current;
a second phase information acquiring circuit; and
a second control circuit, wherein the power-collector closed circuit further includes:
a second power collector-side inductance element configured to electromagnetically couple to the second module-side inductance element to generate an induced electromotive force; and
a reference AC wave generation source configured to generate the reference AC current, and
wherein, when the reference AC current flowing in the power-collector closed circuit flows through the second power collector-side inductance element, the second module-side inductance element electromagnetically coupled to the second power collector-side inductance element generates an AC current corresponding to the reference AC current in the second power generation module, and the second control circuit acquires phase information related to the reference AC current via the second phase information acquiring circuit so that the second control circuit controls the second AC generation circuit in accordance with the phase information.

8. The power generation system according to claim 7, wherein the second power generation module further includes a second capacitance element configured to cause resonance together with the second module-side inductance element.

9. The power generation system according to claim 8, wherein the second control circuit is configured to acquire frequency information related to the reference AC current via the second phase information acquiring circuit, and
wherein the second control circuit is configured to control a capacitance value of the second capacitance element in accordance with the frequency information.

10. The power generation system according to claim 8, wherein a timing at which the second control circuit starts a mode of acquiring the phase information is set based on comparison between a period of the reference AC current and a period calculated from an inductance value of the second module-side inductance element and a capacitance value of the second capacitance element.

11. The power generation system according to claim 7, wherein the second power generation module further includes a second switching element configured to switch a target to be connected in parallel to the second power generation element between the second AC generation circuit and the second phase information acquiring circuit,
wherein, when the second control circuit acquires the phase information, the second control circuit switches a connection destination of the second switching element to the second phase information acquiring circuit, and
wherein, when the second control circuit controls the second AC generation circuit in accordance with the phase information, the second control circuit switches the connection destination of the second switching element to the second AC generation circuit.

12. The power generation system according to claim 7, wherein the first power collector-side inductance element and the second power collector-side inductance element are connected to each other in series, and
wherein the power generation system further comprises a switching element arranged between the first power collector-side inductance element and the second power collector-side inductance element, the switching element being configured to switch a connection state between the first power collector-side inductance element and the second power collector-side inductance element.

13. The power generation system according to claim 7, wherein the power-collector closed circuit further includes an output terminal configured to output the induced electromotive force generated in the first power collector-side inductance element and the induced electromotive force generated in the second power collector-side inductance element.

14. The power generation system according to claim 13, wherein the power-collector closed circuit further includes a DC conversion circuit configured to convert the induced electromotive force generated in the first power collector-side inductance element and the induced electromotive force generated in the second power collector-side inductance element into DC power.

15. The power generation system according to claim 7, wherein the reference AC wave generation source is configured to generate the reference AC current with use of the induced electromotive force generated in at least one of the first power collector-side inductance element or the second power collector-side inductance element.

16. The power generation system according to claim 1, wherein the first power generation module further includes a first capacitance element configured to cause resonance together with the first module-side inductance element.

17. The power generation system according to claim 16, wherein the first control circuit is configured to acquire frequency information related to the reference AC current via the first phase information acquiring circuit, and
wherein the first control circuit is configured to control a capacitance value of the first capacitance element in accordance with the frequency information.

18. The power generation system according to claim 16, wherein a timing at which the first control circuit starts a mode of acquiring the phase information is set based on comparison between a combination of an inductance value of a module-side reference inductance element and a capacitance value of a reference capacitance element and a combination of an inductance value of the first module-side inductance element and a capacitance value of the first capacitance element.

19. The power generation system according to claim 1, wherein the first power generation module further includes a first switching element configured to switch a target to be connected in parallel to the first power generation element between the first AC generation circuit and the first phase information acquiring circuit,
wherein, when the first control circuit acquires the phase information, the first control circuit switches a connection destination of the first switching element to the first phase information acquiring circuit, and
wherein, when the first control circuit controls the first AC generation circuit in accordance with the phase information, the first control circuit switches the connection destination of the first switching element to the first AC generation circuit.

20. A control method for a power generation system, the power generation system including:
a first power generation module, including:
a first power generation element;
a first AC generation circuit configured to convert a first DC current output from the first power generation element into a first AC current;
a first module-side inductance element configured to generate a magnetic field from the first AC current;
a first phase information acquiring circuit; and
a first control circuit; and
a power-collector closed circuit including a first power collector-side inductance element configured to electromagnetically couple to the first module-side inductance element to generate an induced electromotive force, the control method comprising the steps of:

generating, when a reference AC current flowing in the power-collector closed circuit flows through the first power collector-side inductance element, an AC current corresponding to the reference AC current in the first power generation module by the first module-side inductance element electromagnetically coupled to the first power collector-side inductance element;

acquiring, by the first control circuit, phase information related to the reference AC current via the first phase information acquiring circuit; and controlling, by the first control circuit, the first AC generation circuit in accordance with the phase information.

* * * * *